(12) United States Patent
Atmur et al.

(10) Patent No.: US 10,520,063 B2
(45) Date of Patent: Dec. 31, 2019

(54) MECHANICAL VIRTUAL ELLIPTICAL DRIVE

(71) Applicant: The Boeing Company, Chicago, IL (US)

(72) Inventors: Robert J. Atmur, Whittier, CA (US); William Patrick Sargent, Fullerton, CA (US)

(73) Assignee: The Boeing Company, Chicago, IL (US)

( * ) Notice: Subject to any disclaimer, the term of this patent is extended or adjusted under 35 U.S.C. 154(b) by 95 days.

(21) Appl. No.: 15/494,396

(22) Filed: Apr. 21, 2017

(65) Prior Publication Data

US 2018/0306278 A1 Oct. 25, 2018

(51) Int. Cl.
| | |
|---|---|
| *H02K 7/116* | (2006.01) |
| *F16H 1/32* | (2006.01) |
| *H02K 41/06* | (2006.01) |
| *F16H 23/10* | (2006.01) |

(52) U.S. Cl.
CPC ............ *F16H 1/321* (2013.01); *H02K 7/116* (2013.01); *H02K 41/065* (2013.01); *F16H 23/10* (2013.01); *H02K 2213/03* (2013.01)

(58) Field of Classification Search
CPC ......... F16H 1/321; F16H 23/10; H02K 7/116; H02K 41/065; H02K 41/06; H02K 2213/03
USPC ....................................................... 475/163
See application file for complete search history.

(56) References Cited

U.S. PATENT DOCUMENTS

| | | | |
|---|---|---|---|
| 37,165 | A | 12/1862 | Gary |
| 1,611,981 | A | 12/1926 | Amberg |
| 2,275,827 | A | 3/1942 | Plensler |
| 2,458,983 | A | 1/1949 | Dunn |
| 2,509,391 | A | 5/1950 | Hansen et al. |
| 2,699,690 | A | 1/1955 | Kobler |
| 2,703,370 | A | 3/1955 | Steensen |
| 2,908,191 | A | 10/1956 | Sundt |
| 2,857,536 | A | 10/1958 | Light |
| 2,866,110 | A | 12/1958 | Schön |

(Continued)

FOREIGN PATENT DOCUMENTS

| | | |
|---|---|---|
| CH | 233459 A | 7/1944 |
| CN | 2276093 Y | 3/1998 |

(Continued)

OTHER PUBLICATIONS

Antonio S de Castro; Exploring a rehnomic system; Dec. 23, 1999, retrieved from the internet at https://arxiv.org/pdf/physics/9912049.pdf, 6 pages.

(Continued)

*Primary Examiner* — Roger L Pang
(74) *Attorney, Agent, or Firm* — Kolisch Hartwell, P.C.

(57) ABSTRACT

A mechanical virtual elliptical drive, including an input motor, a wobble plate, a stator gear, and an output plate. The input motor may have a rotation axis, a substantially flat surface, and a rounded protrusion extending from the flat surface. The wobble plate may have a wobble axis disposed at a non-zero angle relative to the rotation axis. The rounded protrusion of the motor may engage a substantially flat face of the wobble plate, thereby causing the wobble plate to nutate around the stator gear.

20 Claims, 5 Drawing Sheets

(56) References Cited

U.S. PATENT DOCUMENTS

| | | |
|---|---|---|
| 2,871,382 A | 1/1959 | Bouvier |
| 3,117,244 A | 1/1964 | Rosain et al. |
| 3,234,393 A | 2/1966 | Ruschmann |
| 3,249,776 A | 5/1966 | Anderson et al. |
| 3,322,984 A | 5/1967 | Anderson |
| 3,341,726 A | 9/1967 | Brinster et al. |
| 3,385,135 A | 5/1968 | Strandberg |
| 3,428,839 A | 2/1969 | Singleton et al. |
| 3,463,953 A | 8/1969 | Maxwell |
| 3,474,272 A | 10/1969 | Newell |
| 3,525,890 A | 8/1970 | Buchanan, Jr. |
| 3,539,847 A | 11/1970 | Gifford |
| 3,579,276 A | 5/1971 | Newell |
| 3,640,154 A | 2/1972 | Massie |
| 3,918,315 A | 11/1975 | Rouverol |
| 3,935,750 A | 2/1976 | Maroth |
| 4,041,808 A | 8/1977 | Fickelscher |
| RE29,411 E | 9/1977 | Newell |
| 4,081,702 A | 3/1978 | Neumann |
| 4,108,017 A | 8/1978 | Rouverol |
| 4,330,725 A | 5/1982 | Hintz |
| 4,495,432 A | 1/1985 | Katsuma et al. |
| 4,906,881 A | 3/1990 | Knight |
| 5,111,102 A | 5/1992 | Meeks |
| 5,747,915 A | 5/1998 | Benavides |
| 5,804,898 A | 9/1998 | Kawai |
| 5,820,504 A | 10/1998 | Geralde |
| 5,906,142 A | 5/1999 | Shirasawa |
| 5,954,610 A | 9/1999 | Kamimura |
| 6,568,929 B2 | 5/2003 | Takagi |
| 6,664,711 B2 | 12/2003 | Baudendistel |
| 7,165,473 B2 | 1/2007 | Kobayashi et al. |
| 7,540,865 B2 | 6/2009 | Griffin et al. |
| 7,824,345 B2 | 11/2010 | Euteneuer et al. |
| 7,841,994 B2 | 11/2010 | Skujins et al. |
| 7,850,623 B2 | 12/2010 | Griffin et al. |
| 7,878,984 B2 | 2/2011 | Jacobsen et al. |
| 7,914,466 B2 | 3/2011 | Davis et al. |
| 7,914,467 B2 | 3/2011 | Layman et al. |
| 7,969,055 B2 | 6/2011 | Titus |
| 8,022,331 B2 | 9/2011 | Reynolds et al. |
| 8,048,004 B2 | 11/2011 | Davis et al. |
| 8,048,060 B2 | 11/2011 | Griffin et al. |
| 8,105,246 B2 | 1/2012 | Voeller et al. |
| 8,137,293 B2 | 3/2012 | Zhou et al. |
| 8,169,118 B2 | 5/2012 | Filatov |
| 8,182,465 B2 | 5/2012 | Griffin et al. |
| 8,210,070 B2 | 7/2012 | Takahashi et al. |
| 8,231,551 B2 | 7/2012 | Griffin et al. |
| 8,257,279 B2 | 9/2012 | Davis et al. |
| 8,368,269 B2 | 2/2013 | Titus |
| 8,376,961 B2 | 2/2013 | Layman et al. |
| 8,377,035 B2 | 2/2013 | Zhou et al. |
| 8,409,114 B2 | 4/2013 | Parins |
| 8,449,526 B2 | 5/2013 | Snyder et al. |
| 8,535,243 B2 | 9/2013 | Shireman |
| 8,551,020 B2 | 10/2013 | Chen et al. |
| 8,551,021 B2 | 10/2013 | Voeller et al. |
| 8,556,914 B2 | 10/2013 | Vrba |
| 8,636,716 B2 | 1/2014 | Griffin et al. |
| 8,646,360 B2 | 2/2014 | Kanai |
| 9,124,150 B2 | 9/2015 | Atmur |
| 9,164,497 B2 | 10/2015 | Cameron et al. |
| 9,281,736 B2 | 3/2016 | Atmur et al. |
| 9,404,489 B1 | 8/2016 | Atmur et al. |
| 9,427,866 B2 | 8/2016 | Hasegawa |
| 9,768,664 B2 | 9/2017 | Atmur et al. |
| 9,929,623 B2 * | 3/2018 | Atmur ................. H02K 7/06 |
| 2009/0064812 A1 | 3/2009 | Gutmann et al. |
| 2010/0224435 A1 | 9/2010 | Yamamori |
| 2013/0319145 A1 | 12/2013 | Shimada |
| 2014/0285072 A1 * | 9/2014 | Atmur ................. H02K 41/065 |
| | | 310/75 R |
| 2015/0015174 A1 | 1/2015 | Atmur |
| 2015/0024896 A1 | 1/2015 | Takahashi et al. |
| 2015/0091491 A1 * | 4/2015 | Cameron ............ G05B 11/011 |
| | | 318/653 |
| 2016/0172928 A1 | 6/2016 | Atmur |
| 2016/0172929 A1 * | 6/2016 | Atmur ................. H02K 7/06 |
| | | 310/37 |
| 2016/0327015 A1 | 11/2016 | Iida et al. |
| 2016/0341283 A1 | 11/2016 | Robuck et al. |
| 2016/0344255 A1 | 11/2016 | Atmur et al. |
| 2017/0122409 A1 | 5/2017 | Atmur et al. |
| 2017/0191549 A1 | 7/2017 | Atmur et al. |
| 2018/0034355 A1 | 2/2018 | Peck, Jr. et al. |

FOREIGN PATENT DOCUMENTS

| | | |
|---|---|---|
| CN | 203098755 U | 7/2013 |
| CN | 104065202 A | 9/2014 |
| DE | 10028964 A1 | 1/2002 |
| DE | 10237686 A1 | 2/2004 |
| DE | 102009002587 A1 | 10/2010 |
| DE | 10237686 B4 | 4/2013 |
| EP | 0565746 A1 | 10/1993 |
| EP | 0719959 A1 | 7/1996 |
| EP | 2169263 A1 | 3/2010 |
| EP | 2169263 B1 | 10/2011 |
| EP | 2535136 A1 | 12/2012 |
| EP | 2782230 A2 | 9/2014 |
| EP | 2838186 A2 | 2/2015 |
| EP | 2933531 A1 | 10/2015 |
| EP | 3096444 A1 | 11/2016 |
| GB | 2211900 A | 7/1989 |
| GB | 2216982 A * | 10/1989 ............. F16H 1/321 |
| GB | 2327998 A | 2/1999 |
| JP | S59113345 A | 6/1984 |
| JP | 60017749 A | 1/1985 |
| JP | S6246045 A | 2/1987 |
| JP | 2014187867 A | 10/2014 |
| JP | 2015039286 A | 2/2015 |
| WO | 2008149696 A1 | 12/2008 |
| WO | 2011154981 A1 | 12/2011 |
| WO | WO-2014034320 A1 * | 3/2014 ............. F16H 1/321 |
| WO | 2014051131 A1 | 4/2014 |
| WO | 2014076772 A1 | 5/2014 |
| WO | 2014118284 A2 | 8/2014 |

OTHER PUBLICATIONS

Machine Design, Sometimes it Pays to be Eccentric, May 18, 2000, retrieved from the internet on Feb. 18, 2015 from http://machinedesign.com/archive/sometimes-it-pays-be-eccentric, 7 pages.

Machine Design, Flexible gears minimize gearhead backlash for life, Jun. 7, 2001, retrieved from the internet on Feb. 18, 2015 from http://machinedesign.com/archive/flexible-gears-minimize-gearhead-backlash-life, 4 pages.

Machine Design, Flatter reducer makes waves, Jan. 24, 2002, retrieved from the internet on Feb. 18, 2015 from http://machinedesign.com/archive/flatter-reducer-makes-waves, 4 pages.

Carl A. Nelson et al., Similarity and Equivalence of Nutating Mechanisms to Bevel Epicyclic Gear Trains for Modeling and Analysis, Journal of Mechanical Design, Mar. 2005, vol. 127, 9 pages.

M. Elmoznino et al., an electro-mechanical Pericyclic CVT (P-CVT), 12th IFToMM World Congress, Besancon, France, Jun. 18-21, 2007, 6 pages.

Francesco Fasso et al., An elemental overview of the nonholonomic Noether theorem, Oct. 18, 2009, 11 pages.

Zeke Susman, Harmonic Drive, EVE5320 Mechatronics, Department of Electrical and Computer Engineering, Utah State University, Mar. 11, 2010, retrieved from the internet on Feb. 18, 2015 from http://mechatronics.ece.usu.edu/ece5320/Schedule/hw01-2010/hw1_Zeke_Susman_a.ppt, 27 pages.

Tom Lipton, Wabble Drive Proof of Principle, Oct. 19, 2012, retrieved from the internet on Feb. 19, 2015 from http://oxtool.blogspot.com/2012/10/wabble-drive-proof-of-principle.html, 8 pages.

Harmonic Drive Systems, Inc., Strengths of HarmonicDrive®, retrieved from the internet on Feb. 18, 2015 from http://www.hds.co.jp/english/company/business/strength/, 5 pages.

(56) References Cited

OTHER PUBLICATIONS

Francesco Fasso et al., Conservation of energy and momenta in nonholonomic systems with affine constraints, May 5, 2015, 16 pages.
European Patent Office, Extended European Search Report in European Patent Application No. 16156922.3-1806, dated Sep. 30, 2016, 6 pages.
European Patent Office, Extended European Search Report in European Patent Application No. 16196546.2-1762, dated May 3, 2017, 9 pages.
European Patent Office, Extended European Search Report in European Patent Application No. 16194812.0-1762, dated Jun. 7, 2017, 8 pages.
U.S. Patent and Trademark Office, Non-Final Office Action in U.S. Appl. No. 14/932,901, dated Feb. 23, 2018, 48 pages.
U.S. Patent and Trademark Office, Non-Final Office Action in U.S. Appl. No. 15/585,544, dated Jul. 11, 2018, 68 pages.
U.S. Patent and Trademark Office, Non-Final Office Action in U.S. Appl. No. 14/989,760, dated Sep. 21, 2017, 40 pages.
European Patent Office, Extended European Search Report in European Patent Application No. 17167409.6-1809, dated Sep. 22, 2017, 9 pages.
European Patent Office, Extended European Search Report regarding European Patent Application No. 18169556.0-1012, dated Oct. 5, 2018, 10 pages.
European Patent Office, Extended European Search Report regarding EP Patent Application No. 18164670.4-1201, dated Jul. 6, 2018, 24 pages.
European Patent Office, Examination Report regarding EP Patent Application No. 18164670.4-1201, dated May 20, 2019, 17 pages.
European Patent Office, Examination Report regarding EP Patent Application No. 18164670.4-1201, dated Oct. 8, 2019, 6 pages.

* cited by examiner

MECHANICAL VIRTUAL ELLIPTICAL DRIVE

FIELD

This disclosure relates to wobble plate drives. More specifically, the disclosed embodiments relate to systems and methods for increasing torque with an elliptically interfacing gear system.

INTRODUCTION

Two or more gears can be used to create a mechanical advantage through a gear ratio. There are many ways to arrange gears so that a single rotation of a first gear results in more or less than one rotation of a second gear in the same amount of time. In certain applications it is desirable to have a motor with a very high gear ratio, where the gear reduction takes place in the smallest possible volume.

Historically, wobble plate drive mechanisms have seemed a promising route toward a drive having a high gear ratio within a small volume. However, in practice, efficient and effective wobble plate drive systems have proven to be elusive, because the forces involved often lead to disengagement of the mechanism, unacceptable levels of vibration, or inefficiency due to friction.

SUMMARY

A mechanical virtual elliptical drive is disclosed, including an input motor, a wobble plate, a stator gear, and an output plate. The input motor may have a rotation axis, a substantially flat surface perpendicular to the rotation axis, and a rounded protrusion extending from the flat surface.

The wobble plate may have a wobble axis and a first substantially flat face perpendicular to the wobble axis and facing generally toward the input motor. A second face in a plane parallel to the first face of the wobble plate may face generally away from the motor and include a plurality of face teeth and a plurality of wobble teeth. The wobble plate may be disposed such that the wobble axis is at a non-zero angle relative to the rotation axis of the motor.

The stator gear may have a stator axis and a plurality of stator teeth configured to engage with the wobble teeth. The output plate may have an output axis and a plurality of output teeth configured to engage with the face teeth. The stator gear may be disposed such that the stator axis is aligned with the rotation axis, and similarly the output plate may be disposed such that the output axis is aligned with the rotation axis.

The rounded protrusion of the input motor may contact the substantially flat face of the wobble plate at a contact point, and engage the wobble plate. The input motor may rotate the protrusion around the stator axis thereby causing the wobble plate to nutate around the stator with the wobble axis precessing around the stator axis. The contact point may also be caused to move ahead of a point of closest approach between the wobble plate and the stator gear, as the point of closest approach moves around the stator axis.

The plurality of wobble teeth may be configured to engage with the plurality of stator teeth, and the plurality of face teeth may be configured to engage with the plurality of output teeth as the wobble plate nutates around the stator gear.

A method for operating the mechanical virtual elliptical drive may include energizing the motor to rotate about the rotation axis, and engaging the rounded protrusion with the substantially flat surface of the wobble plate, thereby causing the wobble plate to nutate. The method may further include engaging the plurality of wobble teeth with the plurality of stator teeth as the wobble plate nutates, thereby causing the wobble plate to rotate. The method may include engaging the plurality of face teeth with the plurality of output teeth as the wobble plate rotates and nutates, thereby causing the output plate to rotate.

The present disclosure provides various apparatuses and methods of use thereof. In some embodiments, a mechanical virtual elliptical drive may include a motor, a wobble plate, a stator gear, and an output plate. In some embodiments, the motor may include two cartridge bearings at an angular spacing of less than 90 degrees. In some embodiments, each of the wobble plate, stator gear, and output plate may include a set of teeth having shapes designed to limit eccentric forces.

Features, functions, and advantages may be achieved independently in various embodiments of the present disclosure, or may be combined in yet other embodiments, further details of which can be seen with reference to the following description and drawings.

DESCRIPTION

Overview

Various embodiments of a mechanical virtual elliptical drive having a motor, wobble plate, stator gear, and output plate are described below and illustrated in the associated drawings. Unless otherwise specified, the mechanical virtual elliptical drive and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other elliptical drives. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

A virtual elliptical drive may include a wobble plate mechanism. In a wobble plate mechanism, one of the gears, for example a wobble plate, nutates around another gear, for example a stator gear. As used herein, the terms "nutate" or "nutation" mean a wobble, a sway, or a circular rocking motion. If the number of gear teeth on the wobble plate and the stator gear are different by one, then such a system has a gear ratio equal to the number of teeth on the stator gear. A wobble plate mechanism only using two gears may achieve a relatively high gear ratio, in a small volume.

Figure 1:
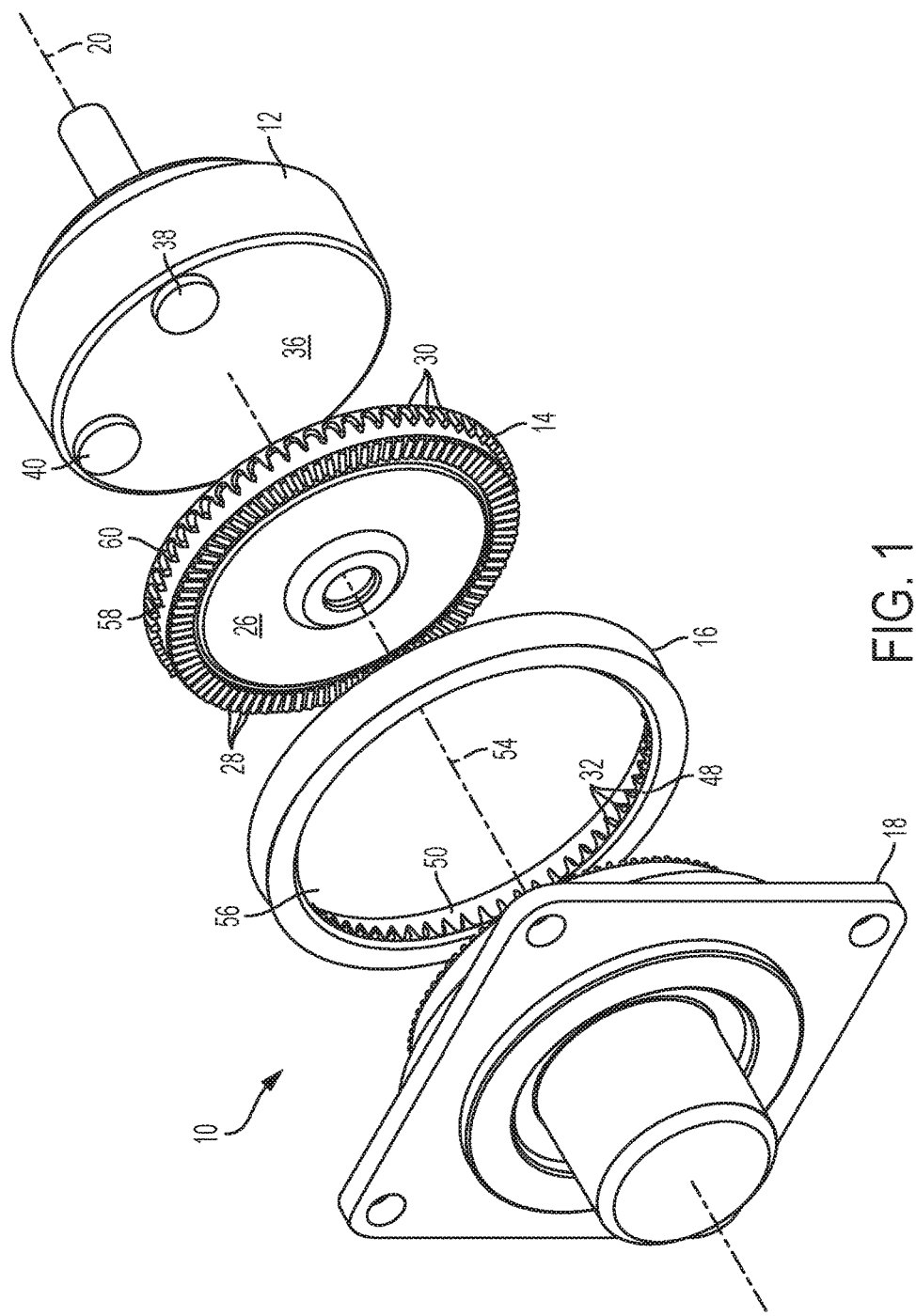
FIG. 1 is an exploded isometric front view of an exemplary wobble plate drive, according to aspects of the present disclosure.
Figure 2:
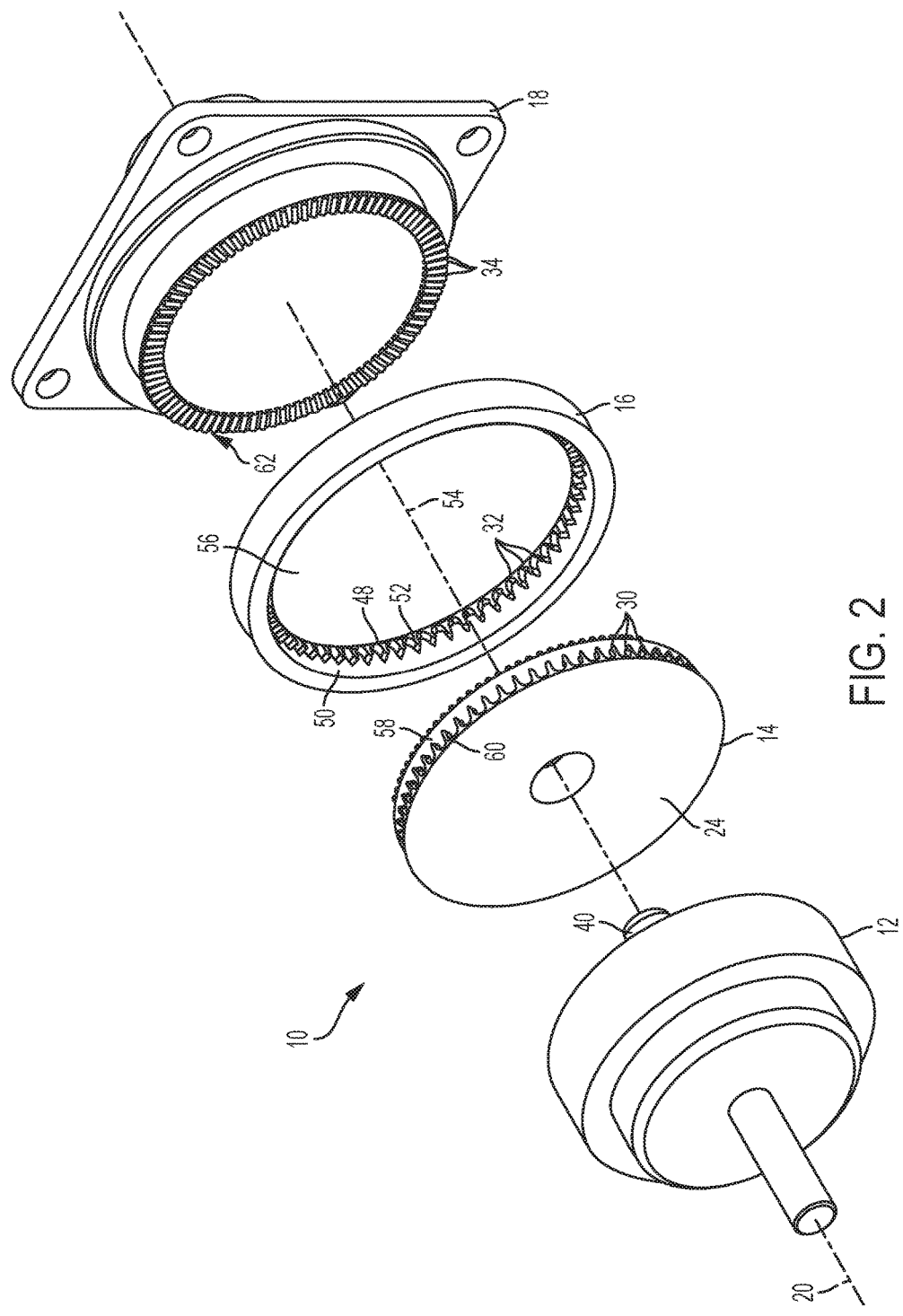
FIG. 2 is an exploded isometric rear view of the wobble plate drive of FIG. 1.

An embodiment of a mechanical virtual elliptical drive can be seen from different angles in FIGS. 1 and 2, and is generally indicated at 10. Drive 10 may include an input motor 12, a wobble plate 14, a stator gear 16, and an output plate 18. Motor 12 may define a rotation axis 20, about which stator gear 16 and output plate 18 may be centered. Wobble plate 14 may be disposed at a non-zero angle relative to the rotation axis.

Wobble plate 14 may have a rear, substantially flat face 24 and a front face 26 with a plurality of face teeth 28 and a plurality of wobble teeth 30. Face teeth 28 may be disposed on front face 26, and wobble teeth 30 may be disposed around a perimeter of the wobble plate between faces 24 and 26, in a plane perpendicular to the wobble axis.

When drive 10 is assembled, motor 12 may engage with rear face 24 of wobble plate 14 to induce the wobble plate to nutate about stator 16. The stator, which also may be referred to as a stator gear, may include a plurality of stator teeth 32 configured to engage with wobble teeth 30, and thereby induce the wobble plate to rotate. Output plate 18 may include a plurality of output teeth 34 configured to engage with face teeth 28, and the wobble plate may thereby induce the output plate to rotate also. In this manner motor 12 may rotate output plate 18 with a torque determined by a first gear ratio between wobble plate 14 and stator 16, and a second gear ratio between wobble plate 14 and output plate 18.

In the embodiment pictured in FIGS. 1 and 2, input motor 12 is an electric motor with a substantially flat surface 36 perpendicular to rotation axis 20 and including a first cartridge bearing 38 and a second cartridge bearing 40 coupled to the flat surface. Bearings 38,40 may be best seen in FIG. 1. The first bearing may be angularly spaced from the second bearing by 89 degrees, as measured with respect to axis of rotation 20. The bearings may be coupled to flat surface 36 proximate a radial edge of the surface.

Bearings 38, 40 may extend from flat surface 36 such that when drive 10 is assembled either bearing 38 or bearing 40 is in contact with rear face 24 of the wobble plate. This contact may be at a point angularly spaced by 45 degrees, as measured with respect to the axis of rotation, from a point of closest approach between the motor and the wobble plate. The bearings may be configured to make rolling contact with rear face 24 of wobble plate 14, and thereby engage with the wobble plate to induce nutation.

In another embodiment, not pictured, a single rounded protrusion (rather than two protrusions) may be formed on flat surface 36 of motor 12. The rounded protrusion may make contact with wobble plate 14 at a point angularly spaced from point 44 by 45 degrees, as measured with respect to the axis of rotation. Other embodiments may include two protrusions spaced apart by an angle between 80 and 100 degrees, but not necessarily exactly 89 degrees. Still other embodiments may include three or more projections extending from flat surface 36.

Regardless of the number of rounded protrusions, a lubricant may be disposed between motor 12 and wobble plate 14, to reduce friction between the rounded protrusions and rear face 24 of the wobble plate. Furthermore, the protrusions may take any shape, or include any mechanism tending to provide low friction rolling engagement of the protrusion(s) with wobble plate 14.

Figure 3:
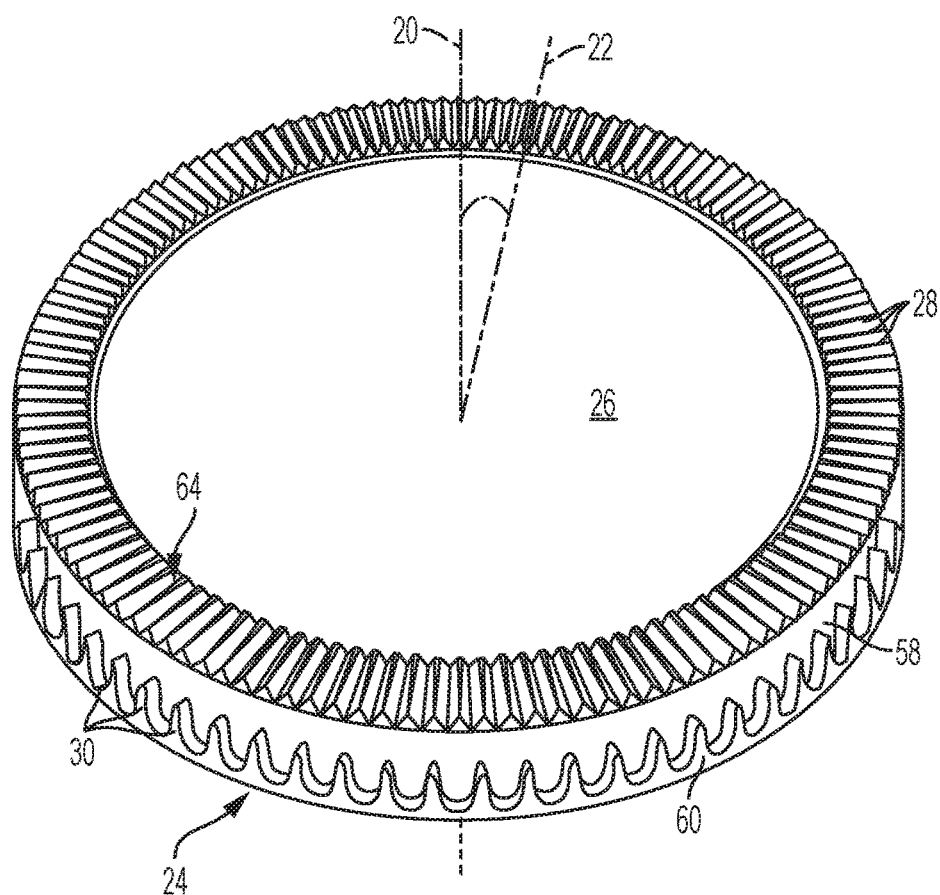
FIG. 3 is an isometric view of a wobble plate of the wobble plate drive of FIG. 1.

As shown in FIG. 3, wobble plate 14 may be shaped similarly to a disc, with a rear face 24, a front face 26 and a central axis, or wobble axis 22. Wobble plate 14 may be aligned such that wobble axis 22 forms a non-zero angle with axis of rotation 20. Rear face 24 may be perpendicular to the wobble axis, while front face 26 defines a plane parallel to the rear face. As shown in FIGS. 1-2, rear face 24 faces generally toward input motor 12 and front face 26 faces generally away from the motor.

Returning to FIG. 3, the plurality of wobble teeth 30 may be disposed around a perimeter of wobble plate 14 between rear face 24 and front face 26 and in a plane perpendicular to wobble axis 22. The wobble teeth may extend from an outer cylindrical surface 58 of the wobble plate in a radial direction away from the wobble axis. The wobble teeth may also extend from a wobble tooth base 60 in an axial direction along the wobble axis. The wobble tooth base may be an approximately annular member coupled to or integral with the wobble plate. The plurality of wobble teeth may extend from both cylindrical surface 58 and wobble tooth base 60. Connecting the wobble teeth to either or both of the cylindrical surface or the wobble tooth base may lend physical support or a degree of rigidity to the plurality of wobble teeth. Any suitable number of wobble teeth 30 may be chosen.

Each wobble tooth 30 may include a first engaging surface and on the opposite side of the tooth may be a second engaging surface. Each surface may be planar, composed of more than one plane, or composed of one or more surfaces with curvature. One or both engaging surfaces of a wobble tooth 30 may be defined by a compound involute of a circle and an ellipse, as will be discussed in more detail below. Alternately, the curve may be the projection of a virtual ellipse onto the tooth location for all angles between 0 and $2\pi$ radians.

Additionally, each wobble tooth 30 may include an engaging portion and a supporting base. The engaging portion may include the first engaging surface and the second engaging surface. The supporting base may connect the engaging portion to wobble tooth base 60.

For each tooth of the plurality of wobble teeth 30, one or both of the first engaging surface and second engaging surface may be defined by a compound involute of a circle and an ellipse. That is, the curve of the second engaging surface may be defined by a first equation:

$$y = C(\tan(\varphi) - \varphi)^D$$

where C is a constant which may be proportional to a radius of the wobble plate, $\varphi$ may take values from 0 to $\pi/2$ radians, and D may have be a positive constant less than 1. D may have a value of approximately 0.65, though other values are also possible. The first equation may be normalized to unity.

Alternately, the curve of the second engaging surface may be defined by a second equation:

$$y = C(\sin(\varphi) - \varphi \cos(\varphi))^D$$

where C is a constant which may be proportional to a radius of the wobble plate, $\varphi$ may take values from 0 to $\pi/2$ radians, and D may have be a positive constant less than 1. D may have a value of approximately 0.65, though other values are also possible.

The second equation may be normalized to a radius of the wobble plate. The curve of the second engaging surface may be the projection of a virtual ellipse onto the tooth location for all angles between 0 and $2\pi$ radians. The curve of the first engaging surface may be a mirror image of the curve of the second engaging surface, reflected across a plane through the apex of the tooth and containing the axis of rotation. Also, the first engaging surface and the second engaging surface may meet smoothly at the apex of each tooth. The cross-sectional shape of the tooth may therefore be defined by a compound involute of a circle and an ellipse.

As depicted in FIG. 3, front face 26 of wobble plate 14 may include an annular wobble surface 64, which in the depicted embodiment is a frustoconical surface. That is, annular wobble surface 64 may be angled relative to a plane perpendicular to wobble axis 22, so that every point on the annular wobble surface includes a frustoconical line that can be extended to a frustoconical vertex located on the wobble axis. The frustoconical vertex of annular wobble surface 64 may coincide with a center of mass of wobble plate 14. In other embodiments, the wobble surface may have a different shape.

A plurality or set of face teeth 28 is disposed on annular wobble surface 64. Any suitable number of face teeth 28 may be chosen, and the number of face teeth may be more, less, or the same as the number of output teeth 34. In the depicted embodiment, there are equal numbers of face teeth 28 and output teeth 34. Each face tooth may include two driving faces, which may be planar, composed of more than one plane, or may be composed of one or more surfaces with curvature.

Referring again to FIGS. 1-2, stator gear 16 may have a base 48 and the base may include an inner cylindrical surface 50 and a stator tooth base 52. Base 48 may include attachment points configured to operatively couple stator 16 to the rest of whatever device is using drive 10. Stator 16 may be stationary within the context of that device. The stator gear may define a stator axis 54 that is substantially aligned with rotation axis 20, and therefore also with the output axis.

Stator 16 may have an interior volume 56 which may be partially defined by inner cylindrical surface 50. Interior volume 56 may be configured to accommodate some or all of wobble plate 14 as described in more detail below.

Stator teeth 32 may be disposed on either or both of inner cylindrical surface 50 and stator tooth base 52. The stator teeth may extend from the inner cylindrical surface into interior volume 56 in a radial direction toward the rotation axis. The stator teeth may extend from stator tooth base 52 in an axial direction along the rotation axis. Any suitable number of stator teeth may be chosen, depending on the application and desired gear ratio. The number of stator teeth may be more, less, or the same as the number of wobble teeth 30.

Each tooth of the plurality of stator teeth may have a proximal end and a distal end, relative to rotation axis 20. The distal end of a stator tooth may be coupled to inner cylindrical surface 50. Each tooth may also include a first engaging surface and on the opposite side of the tooth may be a second engaging surface. Each engaging surface may be planar, composed of more than one plane, or composed of one or more surfaces with curvature.

One or both engaging surfaces of a stator tooth 32 may be defined by a compound involute of a circle and an ellipse, as previously described. Alternately, the curve may be the projection of a virtual ellipse onto the tooth location for all angles between 0 and $2\pi$ radians.

Each tooth of the plurality of stator teeth 32 may include an engaging portion and a supporting base. The engaging portion may include the first engaging surface and the second engaging surface. The supporting base may couple the engaging portion to stator tooth base 52.

As depicted in FIGS. 1-2, output plate 18 may comprise a plurality of output teeth 34 disposed on an annular output surface 62. Output plate 18 also has an output axis substantially aligned with rotation axis 20.

Best seen in FIG. 2, output surface 62 is frustoconical. That is, annular output surface 62 is angled relative to a plane perpendicular to the rotation axis 20, so that every point on the annular output surface includes a frustoconical line that can be extended to a frustoconical vertex located on the rotation axis and forward of output plate 18. When the above-recited elements are assembled into drive 10, the frustoconical vertex of annular output surface 62 may coincide with a center of mass of wobble plate 14. In other embodiments, the output surface may have different shapes, such as cylindrical or frustoconical with a different vertex.

Any suitable number of output teeth 34 may be chosen, and the number of output teeth may be more, less, or the same as the number of face teeth 28. In the depicted embodiment, there are equal numbers of output teeth 34 and face teeth 28. Each output tooth may include two driven faces and each driven face may be planar, composed of more than one plane, or may be composed of one or more surfaces with curvature.

Figure 4:
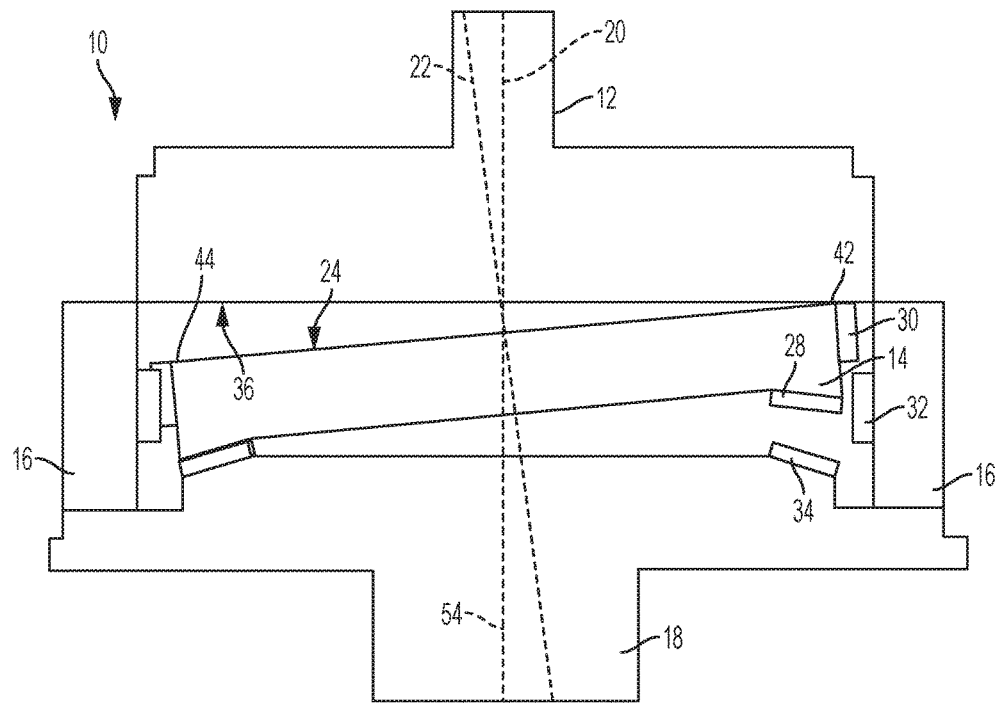
FIG. 4 is a cross-sectional view of the wobble plate drive of FIG. 1, taken along a plane parallel to a rotation axis of the drive.
Figure 5:
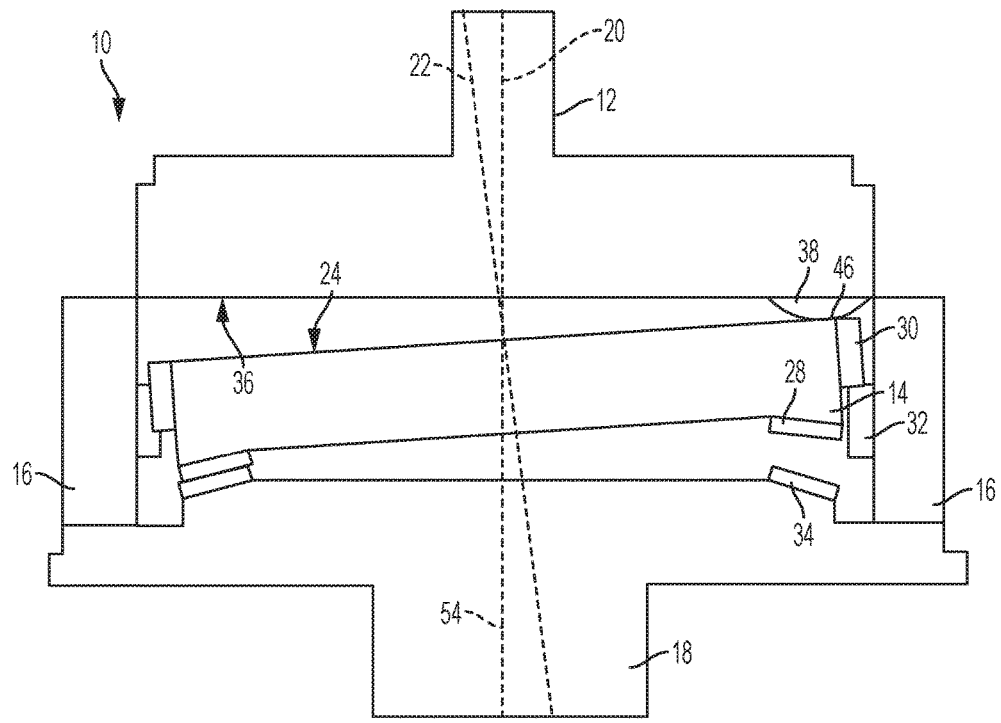
FIG. 5 is another cross-section view of the wobble plate drive of FIG. 1, taken along a plane rotated 45 degrees from the plane of FIG. 4.

FIGS. 4-5 are cross-sectional views of drive 10, showing motor 12, wobble plate 14, stator gear 16, and output plate 18 in an assembled configuration. The motor and output plate may be aligned along stator axis 54. That is the rotation axis, the output axis, and the stator axis may be substantially aligned. The wobble plate and wobble axis 22 may be disposed at any desired and suitable non-zero angle relative to the stator axis. As wobble plate 14 nutates around stator 16 and output plate 18, the center of mass of the wobble plate may be substantially stationary.

FIG. 5 is a cross-section in a plane rotated 45 degrees from the plane of the cross-section of FIG. 4, about stator axis 54, and the angle in each has been exaggerated to more clearly show relationships between components.

Wobble plate 14 is configured to engage with stator gear 16. More specifically, wobble teeth 30 are configured to engage with stator teeth 32. In the case where motor 12 rotates in a first rotation direction, the first engaging surface of a wobble tooth may engage with the first engaging surface of a stator tooth. That is, there may be a contact force exerted on the wobble plate by the stator gear through an interaction between the first engaging surfaces of the plurality of stator teeth and the first engaging surfaces of the first plurality of wobble teeth. These contact forces may cause the wobble plate to rotate in the first rotation direction and nutate in a first nutation direction.

In general, the stator gear has n stator teeth and the wobble plate has m wobble teeth, where n and m are integers that differ by one or more, but typically by one. As the wobble plate nutates around the stator gear, each tooth in the plurality of wobble teeth may engage with one tooth in the plurality of stator teeth during a single nutation. As there may be one more stator teeth than wobble teeth, the wobble plate may rotate slightly during a single nutation.

Specifically, the wobble plate may rotate 1/m of a complete rotation during a single nutation of the wobble plate. In other words, if the wobble plate rotates by 1/m of a complete rotation, perhaps due to an interaction with the motor, the wobble plate may complete one full nutation. Thus, the wobble plate and the stator gear may interact according to a gear ratio of m:1. For every m nutations of the wobble plate, the wobble plate may rotate exactly once. Thus, the gear ratio of the disclosed systems can be determined by the number of teeth m and n of the wobble plate and stator gear, respectively.

The wobble plate and the stator gear may be configured so that any contact forces exerted between them will point in directions that are tangent to circles which lie in planes perpendicular to the rotation axis. Contact forces may point in a direction that is substantially perpendicular to the wobble axis 22 and to a radial line extending from a point of contact between a wobble tooth 30 and a stator tooth 32 to the wobble axis 22.

Wobble plate 14 and stator gear 16 may be substantially circular in shape, with a projection of the wobble plate onto the stator being elliptical in shape due to their differing orientations. The pluralities of wobble teeth 30 and stator teeth 32 may be contoured by projecting this virtual ellipse onto the tooth location. The elliptical projection of wobble plate 14 onto stator 16 may thereby be constrained to non-eccentric rotation. Eccentric motion, if allowed, may drive large imbalance forces creating unacceptable system performance.

Wobble plate 14 is also configured to engage with output plate 18, through engagement of face teeth 28 and output teeth 34. When the wobble plate rotates in a first rotation direction, the first driving face of a wobble tooth may engage with the first driven face of an output tooth. That is, there may be a contact force exerted on the output plate by the wobble plate through an interaction between the first driving faces of the plurality of face teeth and the first driven faces of the plurality of output teeth. These contact forces may cause the output plate to rotate in the first rotation direction. When he wobble plate rotates in a second rotation direction, contact forces between the second driving faces of the wobble teeth and the second driven faces of the output teeth may cause the output plate to rotate in the second rotation direction.

In the exemplary embodiment of drive 10, the output plate and the wobble plate have the same number of teeth, i.e., the number of output teeth is equal to the number of face teeth. Accordingly, in the depicted embodiment, the output plate and the wobble plate interact and rotate according to a gear ratio of 1:1. That is, for every single complete rotation of the wobble plate, the output plate also completes exactly one complete rotation. Other choices for the numbers of output and face teeth are possible and would lead to other values for the output gear ratio.

Wobble plate 14 and output plate 18 may be configured so that any contact forces exerted between them will point in directions that are tangent to circles which lie in planes perpendicular to the rotation axis. For example, a contact force may point in a direction that is substantially perpendicular to the wobble axis 22 and to radial line extending from a point of contact between a face tooth 28 and an output tooth 34 to the wobble axis 22.

By configuring the wobble plate and output plate so that contact forces between them point in such directions, eccentric forces may be avoided. Eccentric forces may cause the plurality of face teeth to disengage from the plurality of output teeth or may cause the center of mass of the wobble plate to oscillate, thereby introducing undesirable vibrations into the drive system.

Wobble plate 14 may have a 0-degree position or point 42 which may be the position or point on the wobble plate which is farthest from output plate 18, as measured in a direction parallel to rotation axis 20. At the 0-degree position, shown in FIG. 4, the wobble plate 14 may be closest to motor 12. Wobble plate 14 may have a 90-degree position or point which may be one-fourth of the way around the wobble plate from the 0-degree position in a first nutation direction. For example, as viewed from a vantage point above the wobble plate near the output plate, the 90-degree position may be ninety degrees around a perimeter of the wobble plate in a counter-clockwise direction. Continuing around the perimeter of the wobble plate, a 180-degree position or point 44 may be located on the opposite side of the wobble plate as the 0-degree position 42. The 180-degree position may mark the closest approach of the wobble plate to the output plate and the stator gear and the point of farthest distance from the motor. A 270-degree position or point may be located on the opposite side of the wobble plate as the 90-degree position.

Motor 12 may be disposed such that 0-degree point 42 is in contact with flat surface 36 of the motor between bearings 38, 40 at a given instant of time, as depicted in FIG. 4. At that same instant of time, only one of bearings 38, 40 may be in contact with rear face 24 of wobble plate 14 at a point 46, as depicted in FIG. 5. The motor may be configured to rotate the bearings around stator axis 54 and thereby cause wobble plate 14 to nutate around stator gear 16, with wobble axis 22 precessing around the stator axis. The point of contact 46 between the bearing and wobble plate 14 may therefore move ahead of 180-degree point 44.

In a case where the motor rotates in a first direction, bearing 38 may be in contact with rear face 24 of the wobble plate at a point between 0-degree position 42 and the 270-degree position and may engage with the wobble plate to cause the wobble plate to nutate in a first direction. FIG. 5 shows bearing 38 in such a case. In a case where the motor rotates in a second direction, bearing 40 may be in contact with rear face 24 of the wobble plate at a point between 0-degree position 42 and the 90-degree position and may engage with the wobble plate to cause the wobble plate to nutate in a second direction.

When drive 10 is in use, wobble plate 14 will generally nutate and also rotate. The wobble plate may be described as configured to nutate around stator gear 16, around motor 12, and/or around output plate 18. In the case where the wobble plate is nutating in the first nutation direction, the 0-degree position of the wobble plate may move toward a current location of the 90-degree position so that, after one quarter of a full nutation, the 90-degree position has become the 0-degree position, the 180-degree position has become the 90-degree position, etc. Furthermore, the wobble plate may not rotate at the same rate it nutates. That is, as the wobble plate completes a single full nutation, the 0-degree position may travel the full perimeter of the wobble plate. During this same time, the wobble plate may rotate less than one full rotation. The rate of rotation may be determined by the rate of nutation and by the gear ratio between wobble teeth 30 and stator gear 16.

Wobble teeth 30 may engage with stator teeth 32 along one-fourth of the stator gear at any moment as the wobble plate nutates. This engagement may be in the form of a rolling contact, where the first engaging surfaces roll along one another. This rolling contact may be in contrast to many standard gear interfaces where opposing faces of gear teeth interact via a sliding contact. In general, assuming the same two surfaces are involved, rolling contact has much less friction than sliding contact between the two surfaces.

The wobble teeth 30 may only make contact with the stator teeth 32 between the 0-degree position and the 270-degree position when nutating in the first nutation direction, and this contact may be limited to rolling contact between subsets of the pluralities of wobble and the stator teeth. Thus, the wobble plate may nutate around the stator with less friction than in the case of a sliding contact. Such a configuration may lead to an efficient transfer of nutational motion or energy to rotational motion or energy.

Similarly, face teeth 28 may only engage with output teeth 34 along one-fourth of the output plate at any moment as the wobble plate nutates. When the wobble plate nutates in the first direction, the face teeth and output teeth may engage between 180-degree position 44 and the 90 degree position. By this engagement, wobble plate 14 may cause output plate 18 to rotate in the same direction as the wobble plate. In the pictured embodiment, where the gear ratio between face teeth 28 and output teeth 34 is 1, output plate 18 may also rotate at the same rate as wobble plate 14. Rotation of motor 12 thus may be transferred to output plate 18 at a higher torque.

Manner of Operation/Use

Figure 6:
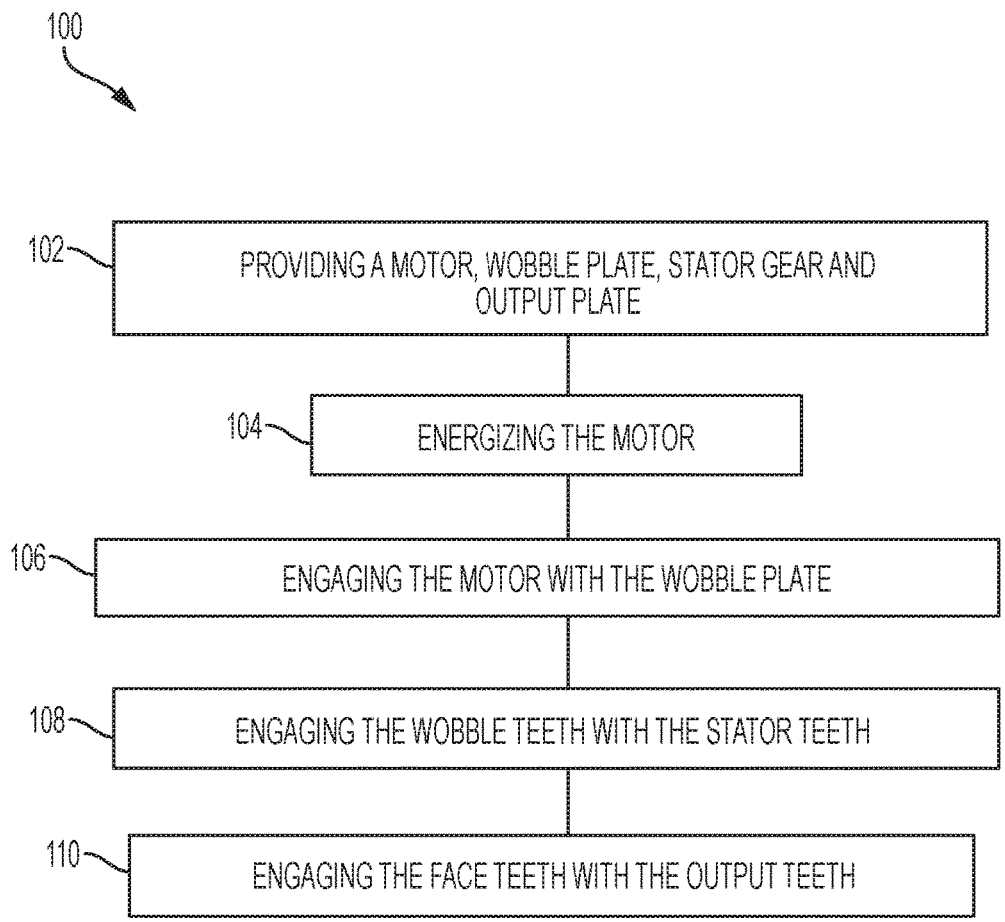
FIG. 6 is a flow chart depicting exemplary methods of use of a wobble plate drive, according to aspects of the present disclosure.

FIG. 6 depicts a method, generally indicated at 100, for operating a mechanical virtual elliptical drive. At step 102, method 100 may include providing a motor with at least one rounded protrusion on a substantially flat surface, which defines a rotation axis, providing a wobble plate with wobble teeth and face teeth, providing a stator gear with stator teeth, and providing an output plate with output teeth. The motor, wobble plate, stator gear and output plate may be constructed and assembled as shown, for example, in FIGS. 1-5 and described above, or in any other suitable manner and configuration consistent with the present teachings.

At step 104, method 100 may include energizing the motor to rotate about the rotation axis. At step 106, method 100 may include engaging one or more of the rounded protrusions of the motor with a substantially flat surface of the wobble plate, thereby causing the wobble plate to nutate. At step 108, method 100 may include engaging the wobble teeth with the stator teeth, thereby causing the wobble plate to rotate. At step 110, method 100 may include engaging the face teeth of the wobble plate with the output teeth of the output plate, thereby causing the output plate to rotate.

Methods of use according to the present teachings may be employed in conjunction with any of the mechanical virtual elliptical drive embodiments previously described. In some embodiments, the method may further include stopping rotation of the motor and allowing the output plate to come to a stop. The method may further include energizing the motor to rotate in a second rotation direction about the rotation axis, thereby rotating the output plate in a second direction.

Alternative Examples

This section describes additional aspects and features of embodiments, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A1. A wobble plate drive, comprising:
an input motor having a rotation axis, a substantially flat surface perpendicular to the rotation axis, and at least one rounded protrusion extending from the substantially flat surface;
a wobble plate having a wobble axis disposed at a non-zero angle relative to the rotation axis of the input motor, a first substantially flat face perpendicular to the wobble axis and facing generally toward the input motor, a second face defining a plane parallel to the first face and facing generally away from the input motor, a plurality of face teeth disposed on the second face, and a plurality of wobble teeth disposed around a perimeter of the wobble plate between the first and second faces in a plane perpendicular to the wobble axis;
a stator gear having a plurality of stator teeth configured to engage with the plurality of wobble teeth; and
an output plate having an output axis substantially aligned with the rotation axis and a plurality of output teeth;
wherein the at least one rounded protrusion is configured to engage with the first face of the wobble plate, and the plurality of face teeth are configured to engage with the plurality of output teeth as the wobble plate nutates around the stator gear.

A2. The wobble plate drive of paragraph A1, wherein the at least one rounded protrusion includes two rounded protrusions, spaced apart by an angle between 80 and 100 degrees measured around the rotation axis.

A3. The wobble plate drive of paragraph A2, wherein the angle is 89 degrees.

A4. The wobble plate drive of paragraph A1, wherein the at least one rounded protrusion is a cartridge bearing.

A5. The wobble plate drive of paragraph A1, wherein the plurality of wobble teeth, the plurality of stator teeth, or both are defined by a compound involute of a circle and an ellipse.

A6. The wobble plate drive of paragraph A1, wherein the plurality of face teeth are disposed on a frustoconical surface of the wobble plate, the frustoconical surface configured such that a center of mass of the wobble plate coincides with a vertex of the frustoconical surface.

B1. A wobble plate drive, comprising:
an input motor including a rounded protrusion extending from a substantially flat surface;
a stator gear having a stator axis;
a wobble plate having a wobble axis disposed at a non-zero angle relative to the stator axis and a substantially flat face oriented generally toward the input motor and contacting the protrusion at a contact point; and
an output plate having an output axis substantially aligned with the stator axis;
wherein the input motor is configured to rotate the protrusion around the stator axis, thereby causing the wobble plate to nutate around the stator gear with the wobble axis precessing around the stator axis, and also thereby causing the contact point to move ahead of a point of closest approach of the wobble plate to the stator gear, as the point of closest approach of the wobble plate to the stator gear moves around the stator axis.

B2. The wobble plate drive of paragraph B1, wherein the wobble plate has a second face oriented generally away from the input motor, a plurality of face teeth disposed on the second face and configured to engage the output plate, and a plurality of wobble teeth disposed in a plane perpendicular to the wobble axis and configured to engage the stator gear.

B3. The wobble plate drive of paragraph B2, wherein the stator gear has a plurality of stator teeth, the output plate has a plurality of output teeth, the plurality of wobble teeth are configured to engage with the plurality of stator teeth, and the plurality of face teeth are configured to engage with the plurality of output teeth as the wobble plate nutates around the stator gear.

B4. The wobble plate drive of paragraph B3, wherein the plurality of wobble teeth and the plurality of stator teeth are each at least partially defined by a compound involute of a circle and an ellipse.

B5. The wobble plate drive of paragraph B3, wherein the plurality of face teeth are disposed on a frustoconical surface of the wobble plate, the frustoconical surface configured such that a center of mass of the wobble plate coincides with a vertex of the frustoconical surface.

B6. The wobble plate drive of paragraph B1, wherein the input motor includes two rounded protrusions extending from the substantially flat surface of the input motor, spaced apart by an angle of 89 degrees measured around a rotation axis of the input motor.

B7. The wobble plate drive of paragraph B1, wherein the rounded protrusion is a cartridge bearing.

B8. The wobble plate drive of paragraph B1, wherein the wobble plate is configured such that contact forces exerted on the wobble plate by any one of the input motor, the stator gear, or the output plate point in directions that are tangent to circles which lie in planes perpendicular to a rotation axis of the input motor.

C1. A method for operating a wobble plate drive, comprising:
energizing a motor to rotate about a rotation axis, wherein the motor has a substantially flat surface and at least one rounded protrusion extending from the substantially flat surface;
engaging the at least one rounded protrusion with a substantially flat surface of a wobble plate, thereby causing the wobble plate to nutate;
engaging a plurality of wobble teeth of the wobble plate with a plurality of stator teeth of a stator gear as the wobble plate nutates, thereby causing the wobble plate to rotate; and
engaging a plurality of face teeth of the wobble plate with a plurality of output teeth of an output plate as the wobble plate nutates and rotates, thereby causing the output plate to rotate.

C2. The method of paragraph C1, wherein the motor includes two rounded protrusions extending from the substantially flat surface of the motor, spaced apart by an angle of 89° measured around the rotation axis, and wherein exactly one of the protrusions is configured to contact the wobble plate at each instant of time.

C3. The method of paragraph C1, wherein the at least one rounded protrusion is a cartridge bearing.

C4. The method of paragraph C1, wherein the plurality of wobble teeth and the plurality of stator teeth are each at least partially defined by a compound involute of a circle and an ellipse.

C5. The method of paragraph C1, wherein the plurality of face teeth are disposed on a frustoconical surface of the wobble plate, the frustoconical surface configured such that a center of mass of the wobble plate coincides with a vertex of the frustoconical surface.

C6. The method of paragraph C1, wherein the wobble plate is configured such that contact forces exerted on the wobble plate by any one of the motor, the stator gear, or the output plate point in directions that are tangent to circles which lie in planes perpendicular to the rotation axis.

Advantages, Features, Benefits

The different embodiments of the mechanical virtual elliptical drive described herein provide several advantages over known solutions for drives with a high gear ratio that also take up a small volume. According to the present disclosure gear ratios in the hundreds and even thousands are possible using only a stator, a wobble plate, and an output plate. For example, the illustrative embodiments described herein allow for high-efficiency non-eccentric motion of a nutating wobble plate. No known system or device can perform these functions, particularly in such a small volume. Thus, the illustrative embodiments described herein are particularly useful for increasing torque of a motor in a small volume with a small number of moving parts. However, not all embodiments described herein provide the same advantages or the same degree of advantage.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible.

To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

We claim:

1. A wobble plate drive, comprising:
an input motor having a rotation axis, a substantially flat surface perpendicular to the rotation axis, and at least one rounded protrusion extending from the substantially flat surface;
a wobble plate having a wobble axis disposed at a non-zero angle relative to the rotation axis of the input motor, a first substantially flat face perpendicular to the wobble axis and facing generally toward the input motor, a second face defining a plane parallel to the first face and facing generally away from the input motor, a plurality of face teeth disposed on the second face, and a plurality of wobble teeth disposed around a perimeter of the wobble plate between the first and second faces in a plane perpendicular to the wobble axis;
a stator gear having a plurality of stator teeth configured to engage with the plurality of wobble teeth; and
an output plate having an output axis substantially aligned with the rotation axis and a plurality of output teeth;
wherein the at least one rounded protrusion is configured to engage with the first face of the wobble plate, and the plurality of face teeth are configured to engage with the plurality of output teeth as the wobble plate nutates around the stator gear.

2. The wobble plate drive of claim 1, wherein the at least one rounded protrusion includes two rounded protrusions, spaced apart by an angle between 80 and 100 degrees measured around the rotation axis.

3. The wobble plate drive of claim 2, wherein the angle is 89 degrees.

4. The wobble plate drive of claim 1, wherein the at least one rounded protrusion is a cartridge bearing.

5. The wobble plate drive of claim 1, wherein the plurality of wobble teeth, the plurality of stator teeth, or both are defined by a compound involute of a circle and an ellipse.

6. The wobble plate drive of claim 1, wherein the plurality of face teeth are disposed on a frustoconical surface of the wobble plate, the frustoconical surface configured such that a center of mass of the wobble plate coincides with a vertex of the frustoconical surface.

7. A wobble plate drive, comprising:
   an input motor including two rounded protrusions extending from a substantially flat surface;
   a stator gear having a stator axis;
   a wobble plate having a wobble axis disposed at a non-zero angle relative to the stator axis and a substantially flat face oriented generally toward the input motor and contacting only one of the protrusions at a time, at a contact point on the flat face of the wobble plate; and
   an output plate having an output axis substantially aligned with the stator axis;
   wherein the input motor is configured to rotate the protrusions around the stator axis, thereby causing the wobble plate to nutate around the stator gear with the wobble axis precessing around the stator axis, and also thereby causing the contact point to move ahead of a point of closest approach of the wobble plate to the stator gear, as the point of closest approach of the wobble plate to the stator gear moves around the stator axis.

8. The wobble plate drive of claim 7, wherein the wobble plate has a second face oriented generally away from the input motor, a plurality of face teeth disposed on the second face and configured to engage the output plate, and a plurality of wobble teeth disposed in a plane perpendicular to the wobble axis and configured to engage the stator gear.

9. The wobble plate drive of claim 8, wherein the stator gear has a plurality of stator teeth, the output plate has a plurality of output teeth, the plurality of wobble teeth are configured to engage with the plurality of stator teeth, and the plurality of face teeth are configured to engage with the plurality of output teeth as the wobble plate nutates around the stator gear.

10. The wobble plate drive of claim 9, wherein the plurality of wobble teeth and the plurality of stator teeth are each at least partially defined by a compound involute of a circle and an ellipse.

11. The wobble plate drive of claim 9, wherein the plurality of face teeth are disposed on a frustoconical surface of the wobble plate, the frustoconical surface configured such that a center of mass of the wobble plate coincides with a vertex of the frustoconical surface.

12. The wobble plate drive of claim 7, wherein the two rounded protrusions extending from the substantially flat surface of the input motor are spaced apart by an angle of 89 degrees measured around a rotation axis of the input motor.

13. The wobble plate drive of claim 7, wherein the rounded protrusions are cartridge bearings.

14. The wobble plate drive of claim 7, wherein the wobble plate is configured such that contact forces exerted on the wobble plate by any one of the input motor, the stator gear, or the output plate point in directions that are tangent to circles which lie in planes perpendicular to a rotation axis of the input motor.

15. A method for operating a wobble plate drive, comprising:
   energizing a motor to rotate about a rotation axis, wherein the motor has a substantially flat surface and one or more rounded protrusions extending from the substantially flat surface;
   engaging only one of the one or more rounded protrusions at a time with a substantially flat surface of a wobble plate, thereby causing the wobble plate to nutate;
   engaging a plurality of wobble teeth of the wobble plate with a plurality of stator teeth of a stator gear as the wobble plate nutates, thereby causing the wobble plate to rotate; and
   engaging a plurality of face teeth of the wobble plate with a plurality of output teeth of an output plate as the wobble plate nutates and rotates, thereby causing the output plate to rotate.

16. The method of claim 15, wherein the motor includes two rounded protrusions extending from the substantially flat surface of the motor, spaced apart by an angle of 89° measured around the rotation axis.

17. The method of claim 15, wherein the one or more rounded protrusions are cartridge bearings.

18. The method of claim 15, wherein the plurality of wobble teeth and the plurality of stator teeth are each at least partially defined by a compound involute of a circle and an ellipse.

19. The method of claim 15, wherein the plurality of face teeth are disposed on a frustoconical surface of the wobble plate, the frustoconical surface configured such that a center of mass of the wobble plate coincides with a vertex of the frustoconical surface.

20. The method of claim 15, wherein the wobble plate is configured such that contact forces exerted on the wobble plate by any one of the motor, the stator gear, or the output plate point in directions that are tangent to circles which lie in planes perpendicular to the rotation axis.

* * * * *